United States Patent [19]
DiGiovanni et al.

[11] Patent Number: 5,935,288
[45] Date of Patent: Aug. 10, 1999

[54] METHOD FOR PRODUCING FUSED FIBER BUNDLES

[75] Inventors: David J. DiGiovanni, Montclair; Donald M. Tipton, New Providence, both of N.J.

[73] Assignee: Lucent Technologies Inc., Murray Hill, N.J.

[21] Appl. No.: 08/999,429

[22] Filed: Dec. 29, 1997

[51] Int. Cl.⁶ ............................................. C03B 37/028
[52] U.S. Cl. ................... 65/408; 65/411; 65/410; 65/501
[58] Field of Search ................ 65/408, 409, 410, 65/411, 501

[56] References Cited

U.S. PATENT DOCUMENTS

| | | | |
|---|---|---|---|
| 3,981,706 | 9/1976 | Strack | 65/410 |
| 4,773,924 | 9/1988 | Berkey | 65/409 |
| 5,223,014 | 6/1993 | Yamauchi | 65/408 |

FOREIGN PATENT DOCUMENTS

| | | | |
|---|---|---|---|
| 60-140203 | 7/1985 | Japan | 65/408 |
| 62-22932 | 5/1987 | Japan | 65/409 |
| 4-153356 | 5/1992 | Japan | 65/408 |

*Primary Examiner*—John Hoffmann
*Attorney, Agent, or Firm*—Mathews, Collins, Shepherd & Gould, P.A.

[57] ABSTRACT

A method for making a fused fiber bundle by providing a bundle of optical fibers, heating the fibers by a flame extending axially along the bundle, and translating the flame axially along the fibers. Tension may be applied to the heated bundle to reduce the diameter of the bundle.

15 Claims, 4 Drawing Sheets

METHOD FOR PRODUCING FUSED FIBER BUNDLES

FIELD OF THE INVENTION

The invention relates to a method and apparatus for making fused optical fiber bundles and, more particularly, to a method for making fused fiber bundles using a flame axially aligned with a fiber array or bundle.

BACKGROUND OF THE INVENTION

Fiber bundles are used in a wide variety of optical applications including optical fiber amplifiers, couplers (single mode), and splitters. Typical fiber bundles include multi-moded fibers that are bundled and epoxied into a ferrule. This type of fiber bundle is often used as a coupler in a cladding-pumped fiber laser. In this application, light from a plurality of low brightness light sources is received by the fiber bundle coupler and bulk optics are used to couple the light from the fiber bundle coupler into a cladding-pumped fiber. See for example, U.S. Pat. No. 5,268,978.

Each multiple-moded fiber of the fiber bundle coupler may include a pure silica core surrounded by a silica cladding doped with fluorine. The fiber bundle couples light received from low brightness light sources into the innermost cladding of a cladding-pumped fiber. The light in the cladding interacts with the core of the pumped fiber and is absorbed by a rare-earth dopant in the core. If an optical signal is passed through the pumped core, it will be amplified; if optical feedback is provided, the cladding-pumped fiber will act as a laser oscillator at the feedback wavelength.

More recently, fiber bundles have been constructed into tapered multiple-moded fiber bundles which are used for more efficiently coupling stripe emitter laser diodes into the cladding of a cladding-pumped fiber. A tapered multiple-moded fiber bundle coupler typically includes a plurality of multiple-moded fibers which extend from an unbundled end region and converge together into a cylindrical-shaped fused bundled intermediate region. The intermediate region, in turn, tapers to a reduced diameter region that approximates the diameter of the cladding-pumped fiber. Such couplers are disclosed in U.S. patent application Ser. No. 08/897,195. Now U.S. Pat. No. 5,864,644 entitled TAPERED FIBER BUNDLES FOR COUPLING LIGHT INTO AND OUT OF CLADDING-PUMPED FIBER DEVICES, filed on Jul. 21, 1997 by the present inventor DiGiovanni et al., which is incorporated herein by reference. At the unbundled region of the coupler, the end of each fiber is coupled to one of the single strip emitter laser diodes. The reduced diameter region of the coupler is coupled to the innermost cladding layer of the cladding-pumped fiber.

A tapered multiple-moded fiber bundled coupler allows the use of a cladding-pumped fiber with a suitably increased numerical aperture which theoretically causes no loss of power. Accordingly, a tapered multiple-moded fiber bundle coupler in conjunction with existing cladding-pumped fiber laser technology allows the fabrication of a fiber laser with reliability much less dependent on the pump diodes.

Tapered multiple-moded fiber bundled couplers are presently fabricated using a transverse fusing process developed for the fabrication of single mode, fused fiber bundle couplers. Single mode couplers typically employ two or three fibers which are twisted together and put under tension. Heat is then applied orthogonal to the axes of the fibers using a small flame or electrical element, and the diameters are reduced by up to 80 percent. Multiple-moded fiber bundled couplers, in contrast, employ more fibers (typically seven) whose diameters are each reduced by less (typically 30 to 50 percent). This lesser diameter reduction combined with the greater number of fibers, results in more than 150 times the cross-sectional area being heated. As consequence, small flames or heater elements employed in the fabrication of single mode couplers can not achieve the heat necessary to melt the extra volume of silica present in tapered multiple-moded fiber bundle couplers. Further, this large mass of silica produces across the fibers a large temperature gradient which often results in deformation during diameter reduction.

Larger flames have been used to generate the necessary heat to fuse the fibers of a tapered multiple-moded fiber bundle coupler, but do so with higher gas flow producing a different type of deformation. The high gas flow against the fibers produces diameter oscillations and/or bending during fusion. In an attempt to eliminate the fiber bending, multiple torches oriented so that they exert opposing forces on the fibers have been used. However, this method requires careful control over gas flow rates at each torch, identical torch design, precise torch location, and shielding from ambient air currents. Baffles or ovens heated by torches have also been used but they typically produce too little heat to allow rounding of the fibers.

The epoxied fiber bundles described earlier have reliability problems and, gaps exist between the bundled fibers that degrade their brightness. Thus, it is also desirable to make these fiber bundles with discrete fibers that are fused and rounded into cylinders or other geometrical shapes for use in various applications. The fabrication of these bundles also requires high temperatures produced by large transverse flames which produce deformation problems.

Accordingly, there is a need for improved method of fabricating a fused fiber bundle which avoids the problems associated with transverse fusing.

SUMMARY OF THE INVENTION

A fused fiber bundle is made by providing an array or bundle of parallel optical fibers, heating the fibers by a flame extending axially along the array or bundle, and translating the flame axially along the fibers. Tension may be applied to the heated fibers to reduce the diameter of the array or bundle.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

DETAILED DESCRIPTION OF THE INVENTION

Figure 1:
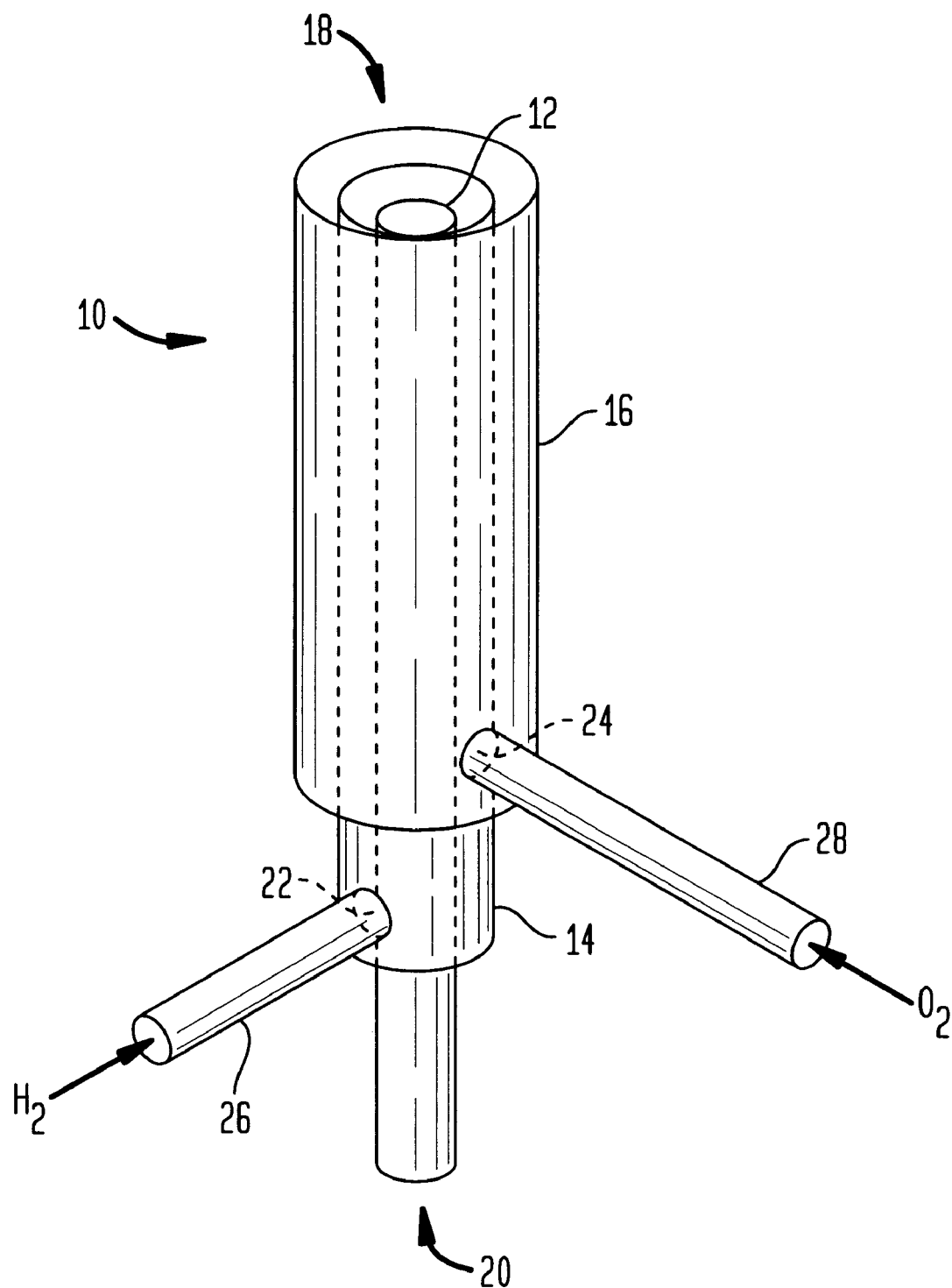
FIG. 1 is a perspective view of an exemplary embodiment of a torch used in the method of the invention.

Referring to FIG. 1, there is shown an exemplary embodiment of a torch 10 used in the inventive method described further on. The torch 10 is conventionally comprised of an open-ended inner tube member 12 coaxially surrounded by first and second open-ended flame outlet tube members 14, 16. All three tube members 12, 14, 16 are spaced-apart from each other and define opposing first and second orifices 18, 20 of the torch 10. Each flame outlet tube member 14, 16 includes a respective side aperture 22, 24 and a gas inlet member 26, 28 that allow the introduction of combustion gases suitable for heating optical fibers. In the shown embodiment, the gas inlet 26 of the first flame outlet tube member 14 introduces hydrogen and the gas inlet 28 of the second flame outlet tube member 16 introduces oxygen. In other embodiments, additional flame outlet tube members can be provided to allow the introduction of other gases such as Helium, to modify the temperature profile or reduce the flame temperature. Moreover, the radial sequence of gases can be varied, and the inner tube 12 can be adapted to contain a flowing gas also. The torch 10 allows optical fibers, which will form a tapered multiple-moded fiber bundle coupler, to be oriented coaxially with the orifices 18, 20 thereof. Accordingly, high temperatures greater than 1800 degrees C. can be used to fuse the fibers into a cylindrical-shaped bundle with minimal orthogonal forces, and to allow a portion of the fused bundle to be tapered by stretching.

Figure 2:
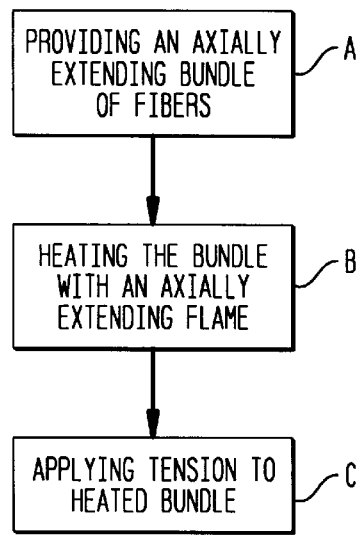
FIG. 2 is a block diagram depicting the steps of the method of the invention.

FIG. 2, is a schematic flow diagram showing the steps of a method for making a tapered multiple-moded fiber bundle coupler of the type described in U.S. patent application Ser. No. 08/897,195, Now U.S. Pat. No. 5,864,644. The coupler includes multiple-moded fibers, each typically constructed with a pure silica core having a diameter of around 104 microns, surrounded by a silica cladding doped with fluorine to provide a numerical aperture of about 0.17 that brings the outer diameter of the fiber to approximately 125 microns. Other fiber compositions, sizes and numerical apertures can also be used. The coupler further includes a centrally located single-mode fiber with a single-mode core and a plurality of cladding layers. The core of the central fiber couples light into or out of the core of a cladding-pumped fiber while the multiple-moded fibers couple light into the cladding of the cladding-pumped fiber. Each of the fibers generally includes a protective coating of urethane or equivalent material to encase and protect the fiber.

Figure 3A:
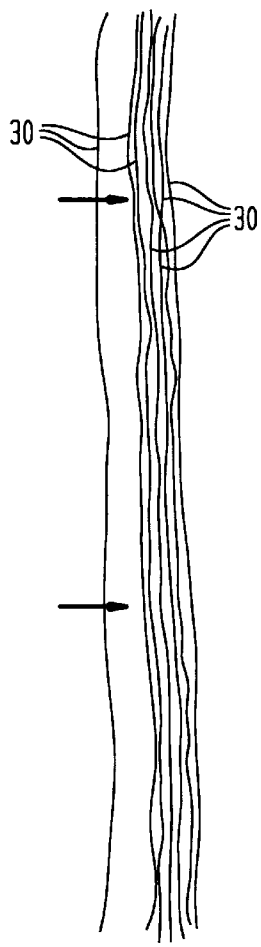
FIGS. 3A–3C schematically depict the steps for providing an axially extending bundle of fibers.
Figure 3B:
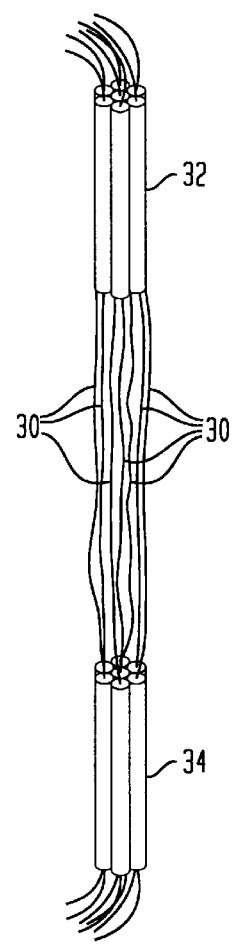
Figure 3C:
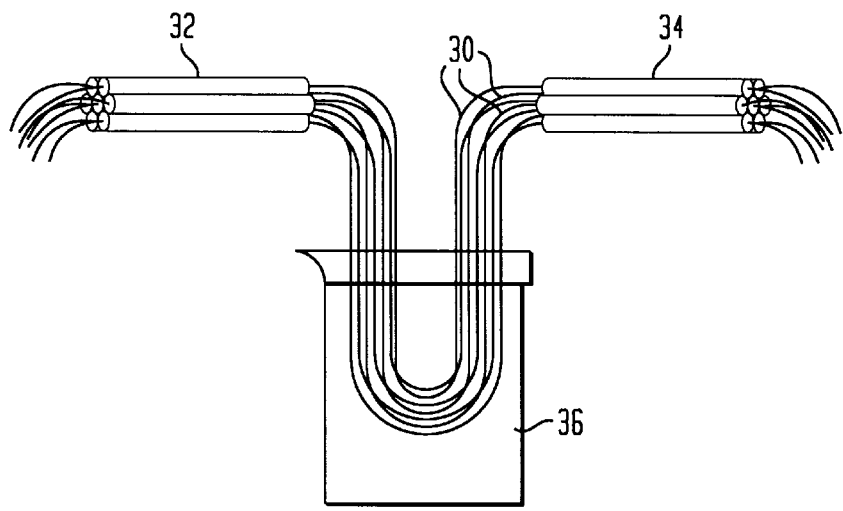

The first step, shown in block A of FIG. 2, includes providing an axially extending array or bundle of fibers. This can be carried out by selecting a plurality of fibers 30 and bundling them together in a close-packed formation as shown in FIG. 3A. In FIG. 3B, the ends of the fibers 30 are then threaded through one or more capillary tubes 32, 34. A bundle of capillary tubes facilitates organizing the fibers. However, a single large diameter capillary tube may also be used or a combination of both. The protective coating on about a ten centimeter long section of the fibers 30 is stripped to facilitate fusing of the fibers by preparing a bath of acid 36 composed of about 80% sulfuric acid and about 20% nitric acid, and placing the ten centimeter long section of the fibers 30 in the bath 36 as shown in FIG. 3C. The stripped section may be intermediate or at the end of the bundle. After stripping, the fibers 30 are rinsed twice; first in acetone and then in high purity deionized water.

Figure 4:
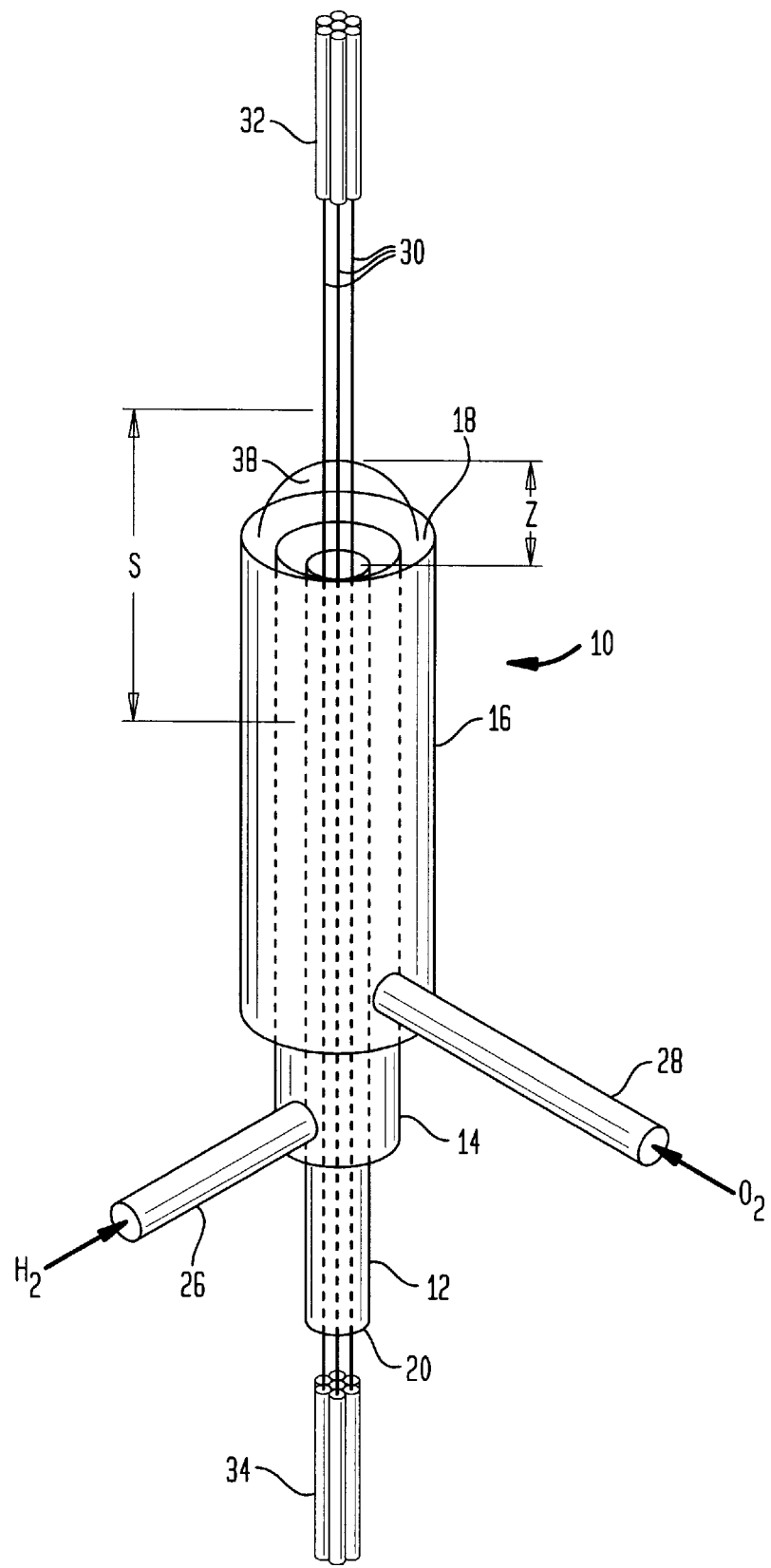
FIG. 4 is a schematic representation depicting the use of the torch of FIG. 1 in the method of the invention.

Next, the capillary tubes 32 at one end of the fiber bundle is clamped to a first translation stage (not shown) and one or more of the capillary tubes 34 at the other end of the fiber bundle is threaded through the inner tube member 12 of the torch 10. The threaded capillary tubes 34 are clamped to a second translation stage (not shown). A twist may be applied thereto inducing an inward force on the fibers 30 and causing the outer six fibers to wrap around the center fiber. The stripped section S of fibers 30 is then lowered into the torch 10 as shown in FIG. 4.

The next step, shown in block B of FIG. 2, involves heating the bundle with an axially extending a flame. The translation stages are operated so that the fibers move relative to the torch while both the ends of the fiber bundle remain stationary relative to each other. This causes the flame to translate axially along the fibers. The flame 38 is created at the first orifice 18 of the torch 10 by introducing combustion gases via the gas inlet members 26, 28 as depicted in FIG. 4. The coaxial orientation between the fibers and the torch produces a circularly symmetrical heat distribution zone Z around the portion of the fibers 30 extending out from the inner tube member 12 that fuses the fibers 30 into a cylindrical-shaped bundle. The forces produced by the gas flowing out through the first orifice 18 of the torch 10 are directed only along the axes of the fibers 30, resulting in substantially no orthogonal fiber deformation. This allows the flame 38 to be larger than the flames used in transverse fusing methods, which in turn, generates the requisite amount of heat for melting the relatively high cross-sectional area fiber bundle (the larger flame substantially reduces the temperature gradient across the fibers 30). Moreover, since orthogonal fiber deformation is not a problem, gas flow and torch design tolerances can be relaxed.

The third step (block C), involves applying tension to the heated bundle. As the flame 38 is applied to the fibers 30, the translation stages are then moved relative to each other at different speeds to place the fibers 30 into tension to create a tapered region in the heated fused cylindrical-shaped bundle. In applications where tapering of the fused cylindrical-shaped bundle is not desired, the third step (block C) is omitted. Additionally, if the fibers are threaded through a single larger diameter capillary tube, it may be desirable to heat the tube and fuse it into the bundle to provide additional strength. This can be accomplished by placing the tube in the intermediate region of the fiber bundle.

Figure 5:
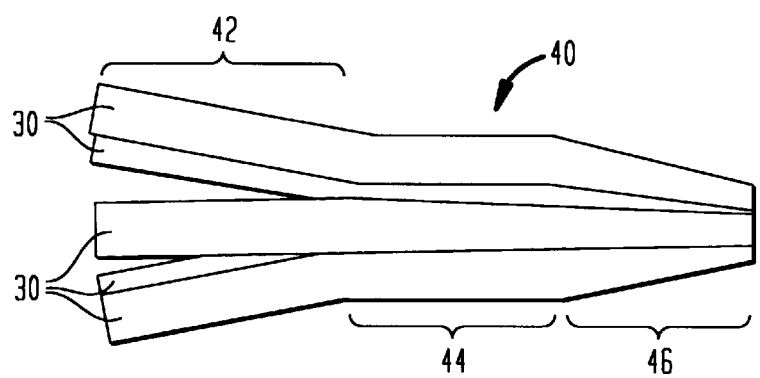
FIGS. 5 and 6 are side and cross-sectional views of a tapered multiple-moded fiber bundle coupler made in accordance with the method of the invention.
Figure 6:
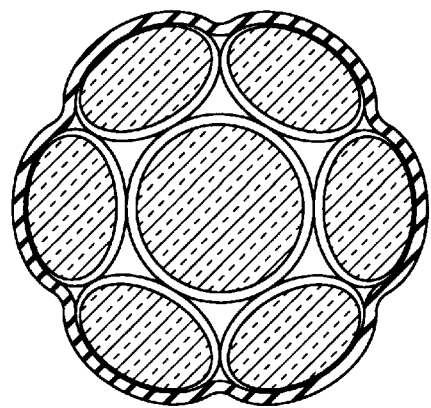

FIGS. 5 and 6, are side and cross-sectional views of a tapered multiple-moded fiber bundle coupler 40 made in accordance with the method of the invention. The fibers 30 (only 5 are visible) of the coupler 40 extend from an unbundled end region 42 and converge together into a cylindrical-shaped fused bundled intermediate region 44. The intermediate region 44, in turn, tapers to a reduced diameter region 46. If the third step of the method has been omitted (applying tension to the heated bundle), the intermediate region of the coupler would not taper to a reduced diameter region. The heating applied during tapering in conjunction with surface tension essentially forms the bundle into a single fiber-like element, where the fibers are arranged in a very close-packed formation with very little wasted interstitial space.

It is to be understood that the above-described embodiments are illustrative of only a few of the many possible specific embodiments which can represent applications of the principles of the invention. For example, the method of the invention can also be used to fabricate a tapered multiple-moded fiber bundle coupler where each fiber of the coupler is a multiple-moded fiber and/or where the fibers are non-circular in cross-section. These types of couplers are also described in U.S. patent application Ser. No. 08/897, 197. Now U.S. Pat. No. 5,864,644. Numerous and varied other changes can be made by those skilled in the art without departing from the spirit and scope of the invention.

What is claimed is:

1. A method of making a fused fiber bundle comprising the steps of:

providing a bundle of optical fibers;

heating said fibers with a flame that is directed coaxially along said bundle; and translating said flame axially along said fibers by inducing relative motion between said flame and said fibers.

2. The method of claim 1, wherein after said step of providing a bundle of optical fibers and before said step of heating, further comprising the steps of:

providing a torch for producing said flame, said torch including an open-ended inner tube member and an open-ended flame outlet tube member coaxially surrounding said inner tube member and spaced therefrom; said tube members defining opposing first and second orifices of said torch; and threading said fibers through said inner tube member so that said fibers extend coaxially with said torch, thereby defining a symmetrical heat distribution zone around a section length of said fibers which extends out from said torch at one of said first and second orifices thereof.

3. The method according to claim 2, wherein said step of heating includes the steps of:

introducing a combustible gas into said flame outlet tube member to produce a flame in said heat distribution zone, said flame providing symmetric heat distribution along said section length of said fibers; and heating said section length of said fibers with said flame to fuse said section length of said fibers together into a fused bundle.

4. The method according to claim 3, wherein said torch further includes at least a second open-ended flame outlet tube member concentrically disposed around said flame outlet tube member and spaced therefrom, said step of introducing including the step of introducing a gas into said second flame outlet tube member to modify heating properties of said flame.

5. The method according to claim 3, wherein said flame outlet tube member includes a gas inlet and said step of introducing includes the step of passing said combustible gas through said gas inlet into said flame outlet tube member to produce said flame.

6. The method according to claim 2, wherein said step of providing said bundle of fibers includes the steps of:

inserting said first ends of said fibers through at least one capillary tube; and inserting said second ends of said fibers through at least a second capillary tube.

7. The method according to claim 6, further comprising the step of stripping a second section length of said fibers to remove a layer coating from each of said fibers immediately after said steps of inserting, said section length located within said stripped second section length.

8. The method according to claim 7, further comprising the step of:

fixing said at least one capillary tube in position immediately after said step of stripping, wherein said step of threading includes threading said at least second capillary tube through said inner tube member so that said stripped second section length of said fibers passes coaxially through one of said first and second orifices of said torch thereby placing said section length in said circularly symmetric heat distribution zone.

9. The method according to claim 8, wherein said plurality fibers includes an inner fiber surrounded by outer fibers, and further comprising the step of rotating said at least second capillary tube relative to said fixed at least one capillary tube to induce an inward force on said fibers thereby wrapping said outer fibers around said inner fiber immediately after said step of threading.

10. The method according to claim 2, further comprising the step of stripping a second section length of said fibers to remove a layer coating from each of said fibers immediately after said step of providing said bundle of fibers, said section length located within said stripped second section length.

11. The method according to claim 10, wherein said step of threading said fibers through said flame outlet member so that said stripped second section length passes coaxially through one of said first and second orifices of said torch thereby placing said section length in said circularly symmetric heat distribution zone.

12. The method of claim 1, wherein said bundle of fibers have first and second ends, and further comprising the step of moving said first and second ends of said fibers relative to each other to produce a tapered portion in said bundle.

13. The method of claim 1, further comprising the step of moving said first and second ends of said fibers relative to said torch while maintaining said first and second ends stationary to each other.

14. The method according to claim 1, wherein said optical fibers comprise multiple-moded optical fibers.

15. The method according to claim 1, wherein said optical fibers comprise a centrally located optical fiber having a single-moded core, said centrally located optical fiber surrounded by a multiple-moded optical fibers.

* * * * *